(12) United States Patent
Jin et al.

(10) Patent No.: US 8,638,334 B2
(45) Date of Patent: Jan. 28, 2014

(54) SELECTIVELY DISPLAYING SURFACES OF AN OBJECT MODEL

(75) Inventors: Hailin Jin, San Jose, CA (US); Liang Wang, Lexington, KY (US)

(73) Assignee: Adobe Systems Incorporated, San Jose, CA (US)

( * ) Notice: Subject to any disclaimer, the term of this patent is extended or adjusted under 35 U.S.C. 154(b) by 976 days.

(21) Appl. No.: 12/323,242

(22) Filed: Nov. 25, 2008

(65) Prior Publication Data

US 2013/0120375 A1 May 16, 2013

Related U.S. Application Data

(60) Provisional application No. 61/091,232, filed on Aug. 22, 2008.

(51) Int. Cl.
*G06T 15/00* (2011.01)
(52) U.S. Cl.
USPC .......................... 345/520; 345/419; 345/582
(58) Field of Classification Search
USPC .......................................... 345/419, 420, 582
See application file for complete search history.

(56) References Cited

U.S. PATENT DOCUMENTS

| | | | | |
|---|---|---|---|---|
| 7,184,052 | B2 * | 2/2007 | Wang et al. | 345/582 |
| 7,292,238 | B1 * | 11/2007 | Van Overveld et al. | 345/419 |
| 7,310,101 | B2 * | 12/2007 | Wang et al. | 345/582 |
| 7,561,164 | B2 * | 7/2009 | Baumberg | 345/582 |

* cited by examiner

*Primary Examiner* — Phu K Nguyen
(74) *Attorney, Agent, or Firm* — Wolfe-SBMC

(57) ABSTRACT

Techniques for selectively displaying surfaces of an object model to a user are described. In one embodiment, a computer-implemented method may include, for a given one of a plurality of surfaces included in an object model that is representative of a physical object, determining a normal vector of the given surface. The method may also include determining an angle between the normal vector of the given surface and a current viewing direction of the model. The method may further include displaying the object model to a user without displaying the given surface to the user, dependent upon determining that the angle between the normal vector and the current viewing direction is greater than a threshold value.

28 Claims, 10 Drawing Sheets

User interface 110   Computer system 120

SELECTIVELY DISPLAYING SURFACES OF AN OBJECT MODEL

RELATED APPLICATION

This application claims priority under 35 U.S.C. §119(e) to U.S. Provisional Patent Application No. 61/091,232 filed Aug. 22, 2008, which is incorporated by reference herein in its entirety.

BACKGROUND

Modeling of physical objects has many applications in the area of computer graphics. For example, computer-based models of objects may be employed to generate animation, to insert digital images into film or photographic images, to design objects, and for many other purposes. As computing power has increased and modeling algorithms have become more sophisticated, it has become possible to model objects of increasing complexity. For example, an object model may include data representative of hundreds or thousands of individual surfaces, or more.

While a complex model having many surfaces may express more realistic detail than a less complex model, maintaining a large number of model surfaces may present usability challenges. For example, as the number of surfaces of a model increases, it may become more difficult to display the model to a user in a way that allows the user to easily interact with the model. A user seeking to edit or manipulate a particular surface of a complex model may be frustrated by a cluttered model display, and may be more likely to inadvertently modify a surface other than the one intended.

SUMMARY OF THE DISCLOSURE

Various embodiments of techniques and systems for selectively displaying surfaces of an object model are disclosed. In one embodiment, a computer-implemented method may include, for a given one of a number of surfaces included in an object model that is representative of a physical object, determining a normal vector of the given surface. The method may further include determining an angle between the normal vector of the given surface and a current viewing direction of the model, and, dependent upon determining that the angle between the normal vector and the current viewing direction is greater than a threshold value, displaying the object model to a user without displaying the given surface to the user.

Figure 1:
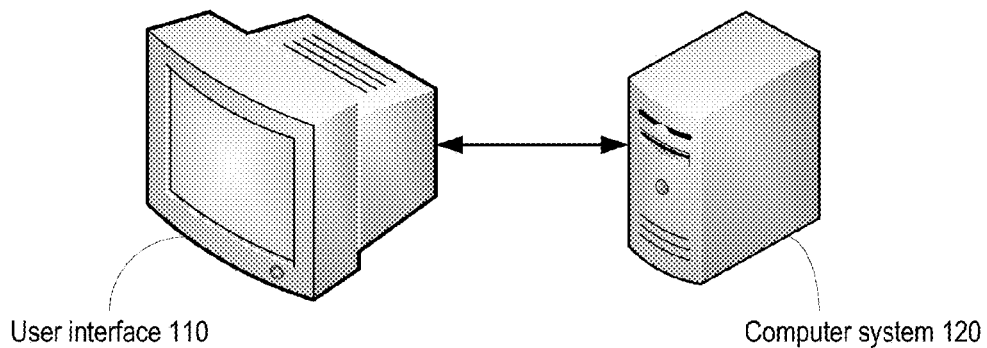
FIG. 1 is a block diagram illustrating one embodiment of a system usable for object modeling.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Overview of Image-Based Modeling

Many computer-based image processing systems make use of graphical models, or simply "models," of real or virtual (i.e., synthetic) objects. By employing object models, an image processing system may enable a number of applications. For example, a model may allow a representation of a physical object to be readily transformed (e.g., rotated, dilated, or otherwise altered) much more easily than the physical object itself could be transformed—if the physical object even exists.

Moreover, using models of individual objects (which may also be referred to as "object models" or simply "models"), the behavior of collections of objects may be realistically modeled. For example, an architect might make use of models of individual buildings or structures planned for a site. By rearranging the individual models and manipulating the overall model containing them, the architect may readily gauge the appearance of different configurations of the site from different visual perspectives. For example, the architect may rotate the overall site model to view its appearance from various ground-level orientations, above, or below. Depending on how richly defined the model data is, more complex uses of the model may also be possible. For example, if the model includes data representative of the qualities of object surfaces (e.g., whether surfaces are opaque, transparent, or translucent), the architect may be able to discern how individual objects obscure the visibility of other objects from various perspectives. Moreover, using rendering techniques, a model may show the effects of light and shadow on individual objects from various sources of illumination relative to various perspectives.

Numerous other applications of object models are possible and contemplated. For example, models may be employed in the generation of computer-generated imagery, such as animation, visual effects, or gaming. Models may be used for urban planning applications, both with respect to aboveground objects such as buildings, fixtures, bridges, roads, vehicles, landscaping, or other objects, as well as with respect to subterranean objects such as pipelines, conduits, rapid transit corridors, geological features, and the like. Models may also be used in the design and prototyping of products, such as vehicles, appliances, tools, equipment, or other products. It is noted that models need not be limited to macroscopic objects, but may also be employed to represent objects at microscopic, atomic, or subatomic scales. Models may also be employed for purely aesthetic, artistic, or decorative purposes, such as in the generation of artwork, as well as for practical or functional purposes.

Generally speaking, a model may correspond to any suitable digital representation of two- or three-dimensional visual objects. In one embodiment, a model representative of a three-dimensional object may include data that defines a number of two-dimensional polygons that represent surfaces of the object. For example, a model of a cube may include data representative of the six rectilinear plane surfaces that make up the surface area of the cube. In some embodiments, an object's curved surface may be approximately represented by a model using a number of planar surfaces, where the accuracy of the approximation is dependent upon the number and size of the planar surfaces used. However, it is contemplated in other embodiments, object surfaces may be modeled using non-planar (e.g., curved) surfaces. For example, the curvature of a model surface may be described in terms of a parameterized function, such that modeling an object using the curved model surfaces involves specifying the curvature parameters for a number of individual model surfaces.

Also, in some embodiments (such as embodiments where a three-dimensional model is constructed from two-dimensional images, as described below), a surface may be defined by a set of points that are not exactly coplanar. For example, if a user who is constructing a model of an object selects four or more points from an image to define a surface of that object, the selected points might not all lie within the same plane. In various such embodiments, a single planar surface that approximates the selected points may be determined through suitable approximation techniques. For example, interpolation may be used to identify the planar surface that minimizes the total error or discrepancy between the identified surface and all of the selected points. Outlier points (e.g., points identified as being more than some statistical or geometric distance away from the other points) may in some instances be disregarded. In some instances, the surface that encompasses the largest possible number of selected points may be selected as the approximated planar surface.

A model that defines multiple surfaces of an object may also include texture data corresponding to each surface that is indicative of the optical properties of that surface. For example, texture data for a particular surface may indicate whether the particular surface is generally reflective or transparent. In some embodiments, texture data may indicate how a surface interacts with light with a high degree of specificity. For example, texture data may define whether incident light is transmitted, scattered, or reflected back towards its source, and may define different such properties for different wavelengths of incident light. In some embodiments, texture data may be implemented using one or more texture maps that may be applied to a surface, where individual maps may be indicative of particular texture properties such as opacity, fine surface structure (e.g., smoothness/bumpiness), or other properties. Texture data may be used in conjunction with rendering techniques to determine the appearance of a surface given particular source(s) of illumination having particular characteristics (e.g., spectrum, intensity) and emanating from particular location(s) relative to the surface.

In one particular embodiment, a model may be implemented as a computer-generated data structure stored on a computer-readable storage medium, such as a memory (e.g., random access memory, nonvolatile "flash" memory) or disk (e.g., magnetic disk or optical disk). A computer-implemented modeling program may be implemented via program instructions stored on a computer-readable storage medium and executable by one or more processors to generate, process, and/or manipulate the model data. For example, model data may include sets of coordinates defined within a suitable coordinate space (e.g., Cartesian, spherical, cylindrical, or other type of coordinate space). Each set of coordinates may correspond to a particular surface polygon of the model, where the individual coordinates identify corresponding vertices of the particular surface polygon. Model data may further include representations of texture data as defined through texture maps, functions, or other suitable techniques. While the foregoing describes one possible way in which model data may be represented, other embodiments are possible and contemplated. For example, a surface may be represented by lines or vectors indicative of the edges of the surface rather than point coordinates indicative of the vertices of the surface.

A model of an object may be generated in any of a number of ways. In some instances, model generation may be part of the object design process. For example, in the course of designing an object such as a manufactured product, a user may construct a representation of the object by specifying the location of its surfaces within a coordinate space, such as by identifying points that identify the vertices of various surfaces. The user may use the model to experiment with configurations of the object, for example by manipulating and rearranging various surfaces of the object, in order to construct virtual prototypes of the object prior to its manufacture. In such an embodiment, the model may be representative of a physical object that does not yet actually exist. That is, the modeled object may be virtual. However, the model itself may be capable of visualization, such as display to a user. For example, the model may include data that may be displayed by a computer, such as on a two-dimensional display (e.g., a monitor or screen), or on a three-dimensional holographic display. The model may also be displayed via a tangible, physical medium. For example, views of the model may be printed on paper or another two-dimensional medium. A model may also be rendered in a three-dimensional medium such as plastic, paper, or any other suitable medium, for example by a prototyping apparatus capable of forming three-dimensional objects from an object model.

In another embodiment, an existing object may be modeled by capturing data from images of the object. For example, a building may be photographed from a number of different angles, showing images of different surfaces of the building. Working with individual images, a user may identify features of the images that correspond to surfaces of the object, and may further identify how the surfaces are related to one another to constitute the object. This technique of generating a model for an object may be referred to as image-based modeling. An image-based model may be generated from any suitable source of image data that is representative of the modeled physical object. For example, such image data may be obtained from still-image digital photography, from digitization of other still image sources such as film or printed media, or from holographic image capturing techniques. Image data may also be obtained from moving-image video sources, such as digital video, videotape, film, or other types of sources. Generally speaking, an image-based model may be capable of any of the same types of display or tangible rendering as those discussed above with respect to models of virtual objects.

One embodiment of a system that may be configured for image-based modeling, and/or user manipulation of existing models however they may be generated, is illustrated in FIG. 1. In the illustrated embodiment, a user interface 110 is shown coupled to a computer system 120. Generally speaking, user interface 110 may correspond to any device or combination of devices that may be employed to allow a user to interact with computer system 120. For example, user interface 110 may correspond to a monitor, projector, or other display device configured to display visual and/or audio data to a user. User interface 110 may also include devices configured to capture user input and convey it to computer system 120. For example, user interface 110 may include a keyboard, mouse, trackball, digitizing tablet, microphone, or any other suitable type of input device. In some embodiments, user interface 110 may implement multiple different types of input and/or output devices in any suitable combination.

Computer system 120 may generally correspond to any type of computer system having one or more processors capable of executing instructions. In various embodiments, computer system 120 may correspond to a personal computer system, a server system, a portable or handheld system, or any other suitable configuration or form factor. More details regarding an exemplary embodiment of computer system 120 are provided below in conjunction with the description of FIG. 9. It is noted that in some embodiments, part of all of user interface 110 may be integrated into computer system 120 as a single physical device or system, such as, e.g., a laptop computer system.

Figure 2:
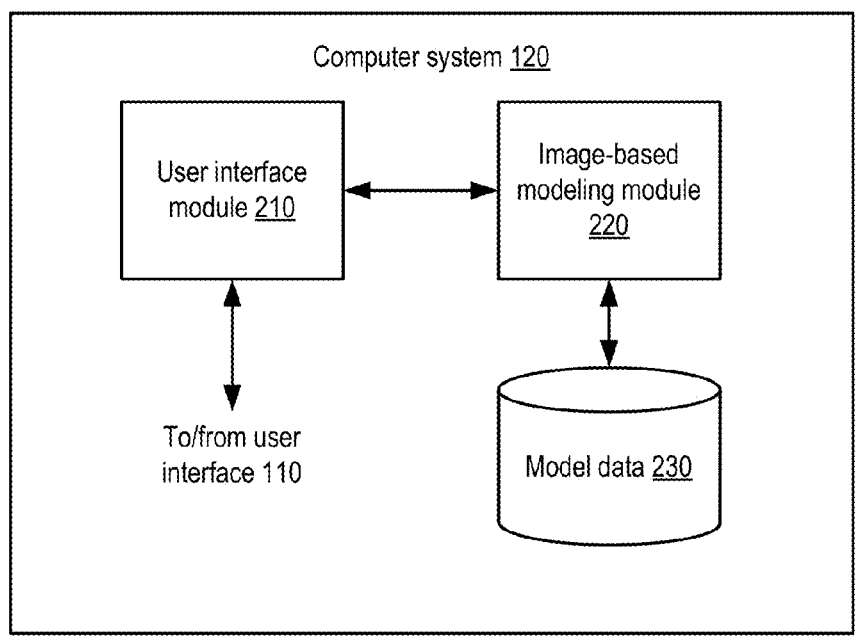
FIG. 2 is a block diagram illustrating one embodiment of a computer system configured for image-based object modeling.

Computer system 120 may be configured to implement an image-based modeling system through which a user may interact with and/or generate object models such as those described above. FIG. 2 illustrates one embodiment of such a configuration. In the illustrated embodiment, computer system 120 may include a user interface module 210 that is configured to interact with user interface 110 as well as an image-based modeling module 220. Computer system 120 may also include a store for model data 230. Collectively, image-based modeling module 220 and model data 230 may be referred to as an image-based modeling system. In various embodiments, some or all of these components may be implemented via dedicated hardware devices implemented within computer system 120, via program instructions executable by a processor within computer system 120, or via a combination of hardware and executable instructions. It is noted that in other embodiments, computer system 120 may implement the functionality of the illustrated elements using a different partitioning than that shown. For example, some or all aspects of user interface module 210 may be integrated within image-based modeling module 220, or implemented within a different component of computer system 120 not shown, such as an operating system or firmware.

Generally speaking, user interface module 210 may be configured to manage the interaction of computer system 120 and user interface 110 with respect to data input and output. For example, user interface module 210 may include device drivers configured to receive input data from a user interface device and convey the input data to other components of computer system 120 for use. Similarly, user interface module 210 may prepare output data generated by other components of computer system 210 for display via a user interface device. In some embodiments, user interface module 210 may also handle the generation and display of standard graphical user interface (GUI) elements, such as windows, pointers, scroll bars, buttons, and/or other GUI elements. Such GUI elements may be provided, for example, as part of a standard application programming interface (API) by an operating system to various applications in order to provide a consistent user interface experience across different types of applications.

Image-based modeling module 220 (or simply, module 220) may include hardware and/or executable instructions configured to implement modeling functionality through which a user may create an object model from image data, or manipulate or edit an existing object model. For example, module 220 may be configured to map input data received from user interface 110 (e.g., via user interface module 210) to a coordinate system used to represent model data, and vice versa. Module 220 may be configured to capture and store user-specified vertex and/or edge data, and to use this data to identify surfaces that make up an object model. For example, as described below, a user may interact with an image of an object to identify surfaces shown in the image. Once the user identifies a surface, for example by selecting the points in the image that correspond to vertices of the surface, module 220 may generate and store data representative of the identified surface and its properties.

In some embodiments, module 220 may also be configured to support editing and/or transformation of existing model data. For example, module 220 may be configured to allow a user to change the position of vertices, or to edit texture maps corresponding to surfaces. Module 220 may implement transformation and/or rendering functions that, when applied to model data, may permit the view of the modeled object that is presented to the user to be rotated, zoomed, illuminated, distorted, or otherwise transformed in any suitable fashion.

Model data store 230 may generally be configured to store the model data operated on by module 220. In various embodiments, model data store 230 may be implemented via any suitable data structure or combination of data structures stored on any suitable storage medium. For example, model data store 230 may be implemented as a collection of vectors, arrays, tables, structured data records, or other types of data structures. Such data structures may be stored, e.g., within a file managed by a file system of an operating system and stored on a magnetic, optical, or solid-state storage device such as a disk or solid-state mass storage device. Model data structures may also be stored as records within a database, as values within physical system memory (including volatile or nonvolatile memory) or virtual system memory, or in any other suitable fashion.

Figure 3A:
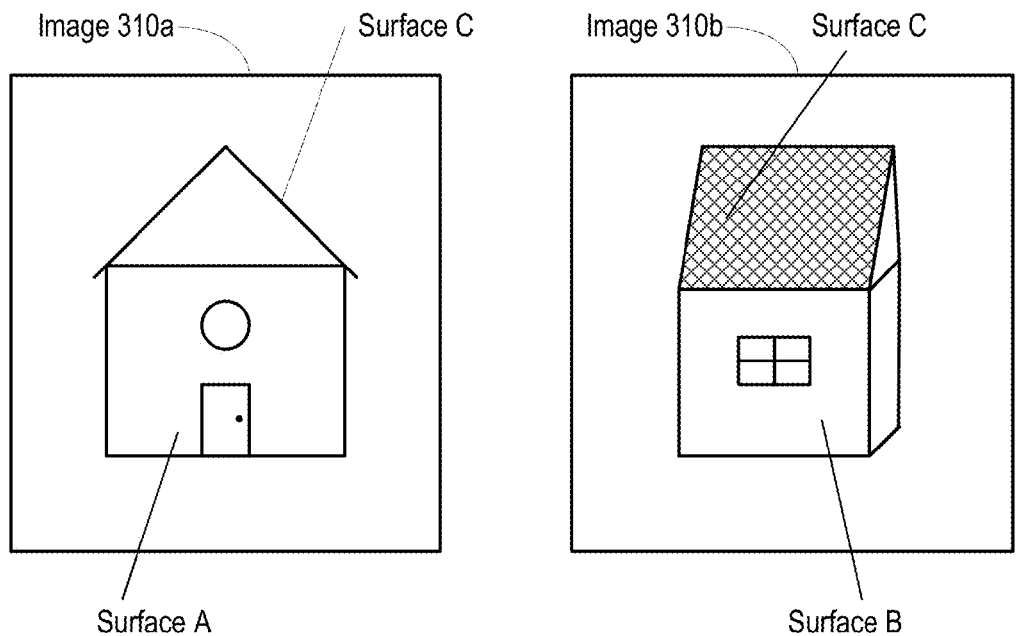
FIG. 3A illustrates several example images depicting different perspectives of an object.
Figure 3B:
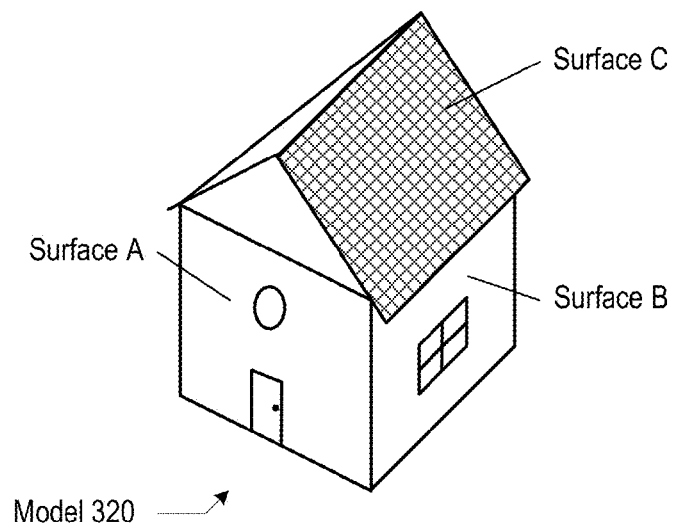
FIG. 3B illustrates one example of an object model derived from images of an object.

FIGS. 3A-B demonstrate one example of how an image-based modeling system, using elements such as those described above, may be employed to generate a three-dimensional object model from a set of images of an object. FIG. 3A illustrates several images 310a-b captured from different perspectives of an object. For example, images 310a-b may correspond to digital photographic images captured with a digital camera, or digitized from a photograph. As shown, image 310a reflects the view of a building from a position directly perpendicular to one of its surfaces, while image 310b reflects a different view of the same building from a position oriented at a slight angle to the surface.

In one embodiment, an image-based modeling system may be configured to present images 310a-b and/or other available images of an object to a user, either sequentially or in combinations. The user may interact with the images to identify particular surfaces of the depicted object. For example, while interacting with image 310a, the user may identify the illustrated surface A by marking or selecting the four corners of the rectangular portion of image 310a that bound surface A (e.g., using a mouse, touchpad, or other input device), and identifying these selected corners to the image-based modeling system as vertices of surface A. Alternatively, the user may identify a surface within an image by identifying its edges, such as by selecting edge features within the image that have been detected by the modeling system, or drawing an edge on the image. Also, the user may identify surface C within image 310a, and may employ similar techniques to identify surfaces B and C within image 310b.

Once several surfaces have been identified within images 310, the image-based modeling system may be configured to generate a three-dimensional model based on the surfaces and information on how the surfaces relate to one another. For example, the user may indicate that surface A of image 310a abuts surface B of image 310b. Alternatively, in some embodiments, the modeling system may be configured to recover such relational data from the images 310. For example, the images 310 may have been encoded with information explicitly identifying the camera position (e.g., in terms of geospatial coordinates), focal length, and/or other positional and intrinsic parameters relevant to the image capture, such that the relative camera motion around the object that is indicated by different images 310 of the object may be determined from this identifying information. In some embodiments, even when positional data for images 310 relative to each other or the imaged object is not known, camera motion recovery algorithms may be employed to determine camera motion data from images 310, for example by analyzing image features relative to common landmarks or reference points within the images.

From the camera motion data and other image parameters, the image-based modeling system may be configured to identify the relative positions of surfaces identified from images 310, and may assemble a three-dimensional model based on the identified surfaces and their relative positions. One example of such a model is displayed in FIG. 3B as model 320. The illustrated model 320 displays object surfaces in addition to those described above, which may have been identified from images 310a-b or other images, or manually entered by the user.

Figure 4A:
FIG. 4A illustrates one example of a raw source image of an object.
Figure 4B:
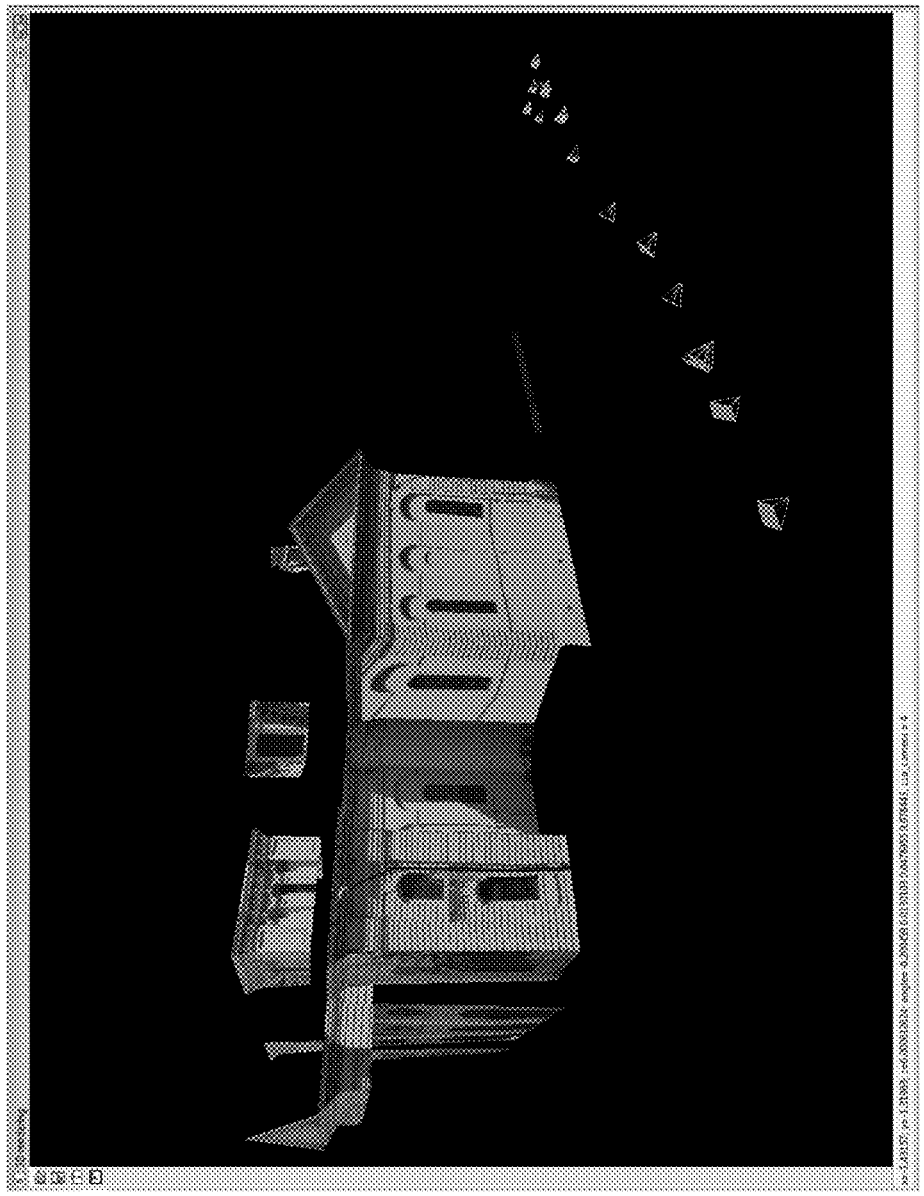
FIG. 4B illustrates a partial three-dimensional model of the object shown in FIG. 4A.
Figure 4C:
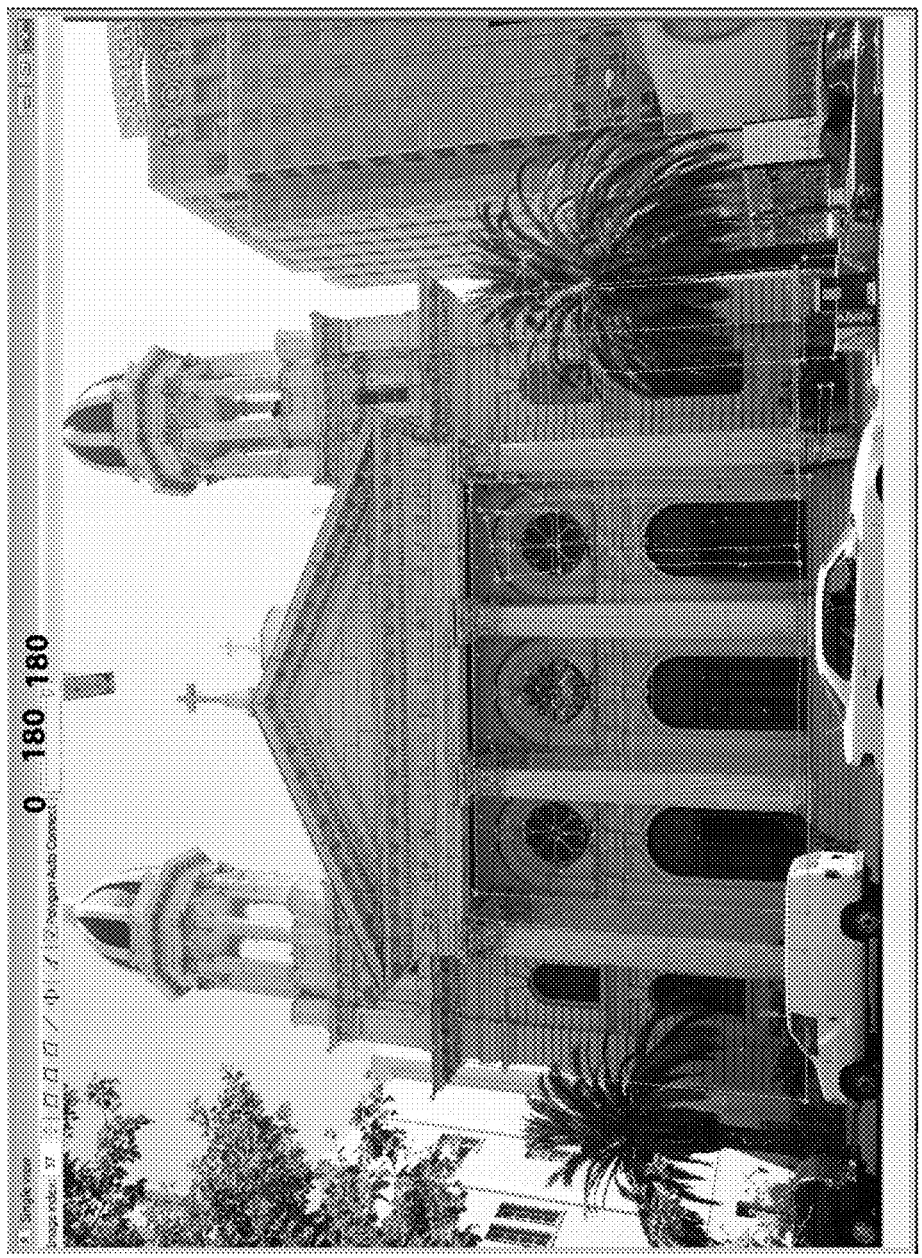
FIG. 4C illustrates the vertices and edges of the model of FIG. 4B superimposed on the image of FIG. 4A.

Depending on the characteristics of the object being modeled, image-based models may be quite complex, having a number of surfaces. When interacting with such a model, for example during the course of constructing or editing the model, the multiplicity of surfaces may create visual clutter in the display of the model. One example of this problem is illustrated in FIGS. 4A-C. FIG. 4A is one of several raw source images used as the basis for generating an image-based model of the illustrated building. As discussed above with respect to FIGS. 3A-B, such a model may be generated through user interaction with the images to identify surfaces of the building to be represented in the model. For example, by clicking or otherwise identifying points within the image of FIG. 4A, a user may identify the portion of the front wall of the church bounded by the underside of the portico and the top of the front steps as one surface. Similarly, the user may identify the triangular facade of the portico as another surface, and may proceed to identify other surfaces in the image of FIG. 4A and other images.

As surfaces are identified from the various source images of the building and added to the model, the model may take shape. FIG. 4B illustrates a partial three-dimensional model of the church shown in FIG. 4A, in which the portions of the source images that have been identified as surfaces have been assembled according to the relationships among the source images. In the illustration, the surfaces identified from the face of the church appearing in FIG. 4A are shown at the left of the three-dimensional model. That is, the model has been rotated to display the right side of the church that is hidden from view in FIG. 4A. (The columns visible in FIG. 4A have not been selected as surfaces, and so are omitted from the model shown in FIG. 4B.) The triangular portico that directly faces the viewer in FIG. 4A is shown in partial profile in the model displayed in FIG. 4B. The model reveals the depth of the portico relative to the front wall of the church, a feature that is only minimally captured in the view of FIG. 4A.

FIG. 4C shows the vertices and edges of the model surfaces of the model shown in FIG. 4B, as superimposed upon the image of FIG. 4A. The vertices and edges are depicted as a wireframe model of green dots connected by green lines. (The scattered blue dots in FIG. 4C and other images are not relevant to the present discussion.) For example, having partially completed the building model using images taken from various perspectives, a user may return to the view of FIG. 4A to identify more surfaces to be added to the model, or may wish to edit surfaces that have already been identified. It may therefore be useful to display to the user those surfaces that have already been identified, so that the user has an accurate view of how the existing model relates to the image, and does not mistakenly identify as a new surface a surface that had previously been identified and added to the model.

However, the superposition of model and image shown in FIG. 4C contains considerable clutter. Many surfaces that are not visible from this perspective of the church are nonetheless shown in the wireframe representation. Inclusion of these surfaces in the image display may make it difficult for a user to work with the object surfaces that are visible from the illustrated perspective. For example, if a user wished to identify a surface corresponding to rightmost column, the clutter of vertices in this region of the image may significantly increase the chances of the user misplacing the new vertices corresponding to the column, or inadvertently selecting a vertex that corresponds to a completely different surface of the model.

Selective Display of Model Surfaces

Figure 5:
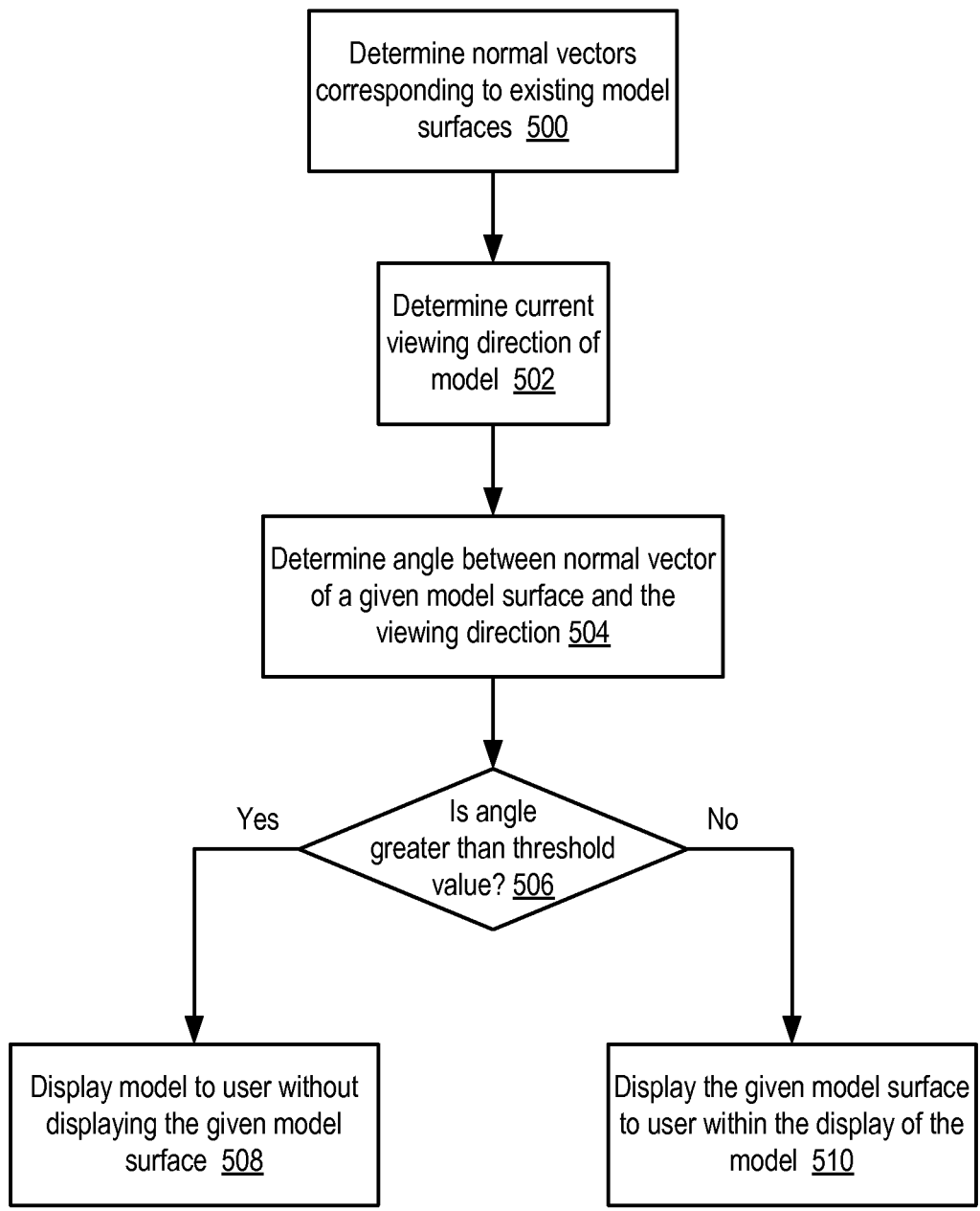
FIG. 5 is a flow diagram illustrating one embodiment of a method of selectively displaying surfaces of a model.

FIG. 5 illustrates one embodiment of a method of selectively displaying surfaces of an object model. In some embodiments, an image-based modeling system may implement the method of FIG. 5, for example as part of the functionality provided by image-based modeling module 220, to reduce the number of model surfaces that may be displayed to a user in certain contexts. Selectively displaying model surfaces may in turn reduce visual clutter such as that illustrated in FIG. 4C.

Operation of the method begins in block 500, where normal vectors corresponding to existing surfaces of the model are determined. Generally speaking, a normal vector of a given planar surface, which may also be referred to as a surface normal, is a vector that is perpendicular to the given planar surface. Additionally, a normal vector has an orientation relative to its associated surface. In general, any plane defined within a three-dimensional space has two sides, although at most one side of a plane can be viewed from any given point in the space. As used herein, the normal vector of a given planar surface is oriented towards the perspective from which the given planar surface is visible.

Theoretically, in the context of visual modeling, each side of a planar surface may be visible from corresponding perspectives. For example, in instances where both exterior and interior perspectives of a building are modeled, a plane corresponding to an exterior wall may have a side that faces the interior of the building. However, the characteristics of the interior and exterior surfaces may be considerably different. Thus, in some embodiments, each surface within a model may be visible from only one side, and may correspondingly have only one normal vector oriented towards the direction from which the surface is visible. In such embodiments, a structure that is visible from two different sides may be modeled as two distinct surfaces rather than one surface having two sides. For example, a wall that is visible from both interior and exterior perspectives may be modeled as an exterior surface and a distinct interior surface.

In general, the normal vector corresponding to a given planar surface may be determined by computing the cross product of two non-parallel vectors lying on the surface of the given planar surface. For example, in the case of surfaces modeled as polygons, the normal vector of a surface polygon may be determined by the cross product of two non-parallel edges of the polygon. Any suitable technique for computing the cross product of the relevant vectors or edges may be employed.

It is noted that normal vectors may also be determined for non-planar surfaces. Generally speaking, a normal vector at a given point on a non-planar surface may be determined by the normal vector of the tangent plane of the non-planar surface at the given point. Thus, a non-planar surface may have a number of normal vectors. In various embodiments, one or several normal vectors may be determined and used to characterize a non-planar surface. For example, a single normal vector may be determined at a specific point of the non-planar surface (e.g., a local maximum, local minimum, centroid, or other point), or several normal vectors may be determined at several points distributed across the non-planar surface.

The normal vector for a given surface may be relatively static, in that once the normal vector is determined, it may not change unless some property of the given surface changes (e.g., if the given surface is reoriented or otherwise modified). Thus, in one embodiments, the normal vector for a given surface may be determined and stored when the given surface is first created within the model, and updated in response to a modification of the given surface. In other embodiments, normal vectors may be determined in response to different events. For example, normal vectors may be generated only in response to a specific user request, such as a user request to selectively limit the display of surfaces in the model as described below. In some embodiments, normal vectors may be generated or updated periodically regardless of whether their corresponding surfaces have been modified.

Continuing with the method of FIG. 5, the current viewing direction of the model may be determined (block 502). In an image-based modeling system where a user works with individual source images to identify surfaces to be modeled, the viewing direction of the model may correspond to the viewing direction of a particular image that the user is currently working with (such as the image of FIG. 4A). Generally speaking, the viewing direction of an image is a vector determined by camera placement at the time the image was generated, as well as intrinsic parameters associated with the image such as lens focal length. In various embodiments, the viewing direction of an image may be determined and stored at the time the image is generated, or may be later recovered from the image data using appropriate algorithms. If a different image is selected for viewing, the viewing direction corresponding to the selected image may be determined.

In some embodiments, a user may view the model itself rather than any particular source image from which the model was derived. For example, after identifying various surfaces, a user may view and manipulate the model shown in FIG. 4B. In this case, the viewing direction of a model may be a vector determined by the viewing position of the user and some point on a surface of the model or within the model (e.g., a center of rotation). If the user's view of the model changes, the viewing direction of the model may be correspondingly updated.

Figure 6:
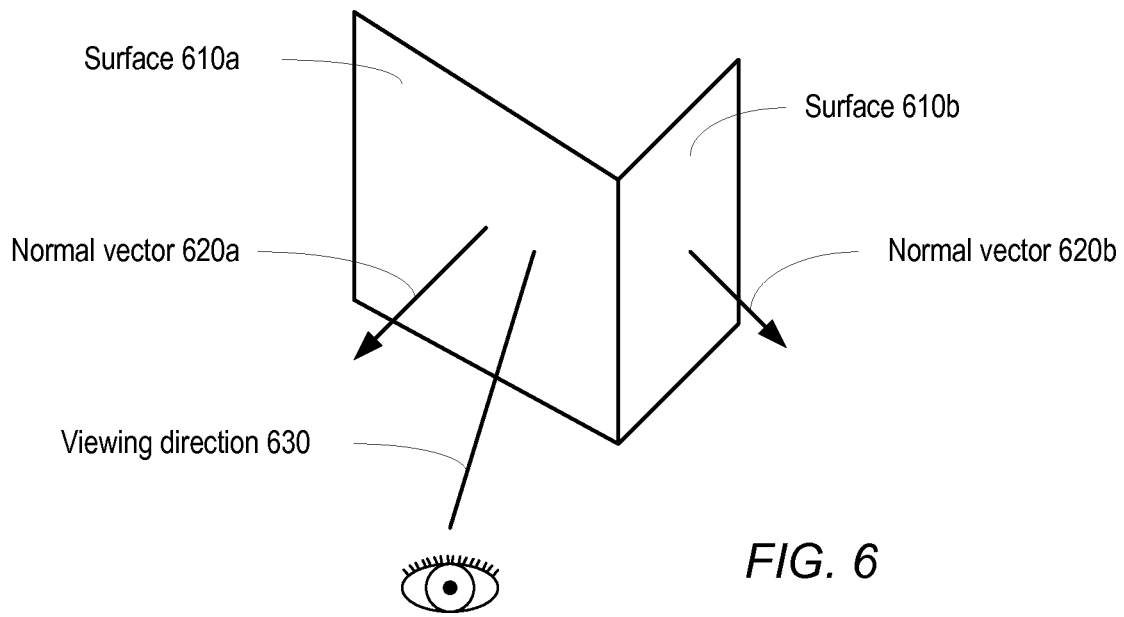
FIG. 6 illustrates one example of a model showing surface normal vectors and a viewing direction.

FIG. 6 illustrates an example of a model for which normal vectors and a viewing direction have been determined. In the embodiment of FIG. 6, two planar surfaces 610a-b are shown along with their respective normal vectors 620a-b. Viewing direction 630 represents the viewing direction of the model including surfaces 610a-b. In an embodiment employing image-based modeling, where surfaces 610a-b correspond to a particular image being viewed by a user, viewing direction 630 may correspond to the viewing direction of the image.

Returning to FIG. 5, the angle between the normal vector of a given model surface and the viewing direction is determined (block 504). For example, the normal vector and viewing direction vectors may be normalized to unit length (if not already normalized). Then, the inverse cosine of the dot product of the two vectors may yield the angle between them.

If the angle between the normal vector of the given model surface and the viewing direction is greater than a threshold value, the model may be displayed to the user without displaying the given model surface (blocks 506, 508). That is, if the angle is greater than the threshold value, the given model surface may be omitted, hidden, obscured, made transparent, or otherwise modified such that although the given model surface remains part of the model, it is not visible.

Similarly, if the angle between the normal vector of the given model surface and the viewing direction is less than the threshold value, the given model surface may be displayed to the user within the display of the model (blocks 506, 510). That is, if the angle is less than the threshold value, the given model surface may be included within whatever type of model display that is presented to the user. In various embodiments, if the angle between the normal vector of the given model surface and the viewing direction equals the threshold value, the given model surface may either be displayed or omitted from the display.

As a result of the activities of blocks 504-510, various surfaces of a model may be selectively displayed or omitted from a display of the model, depending on whether the angles between the normal vectors of the various surfaces and the viewing position satisfies the threshold value or not.

In some embodiments, the threshold value against which angles are compared may be a parameter that is user-adjustable. For example, image-based modeling module 220 or another component of a modeling system may be configured to provide a user interface feature through which a user may specify the threshold angle to be applied to a display of a model. In various embodiments, such a user interface feature may be implemented as a mouse-adjustable slider, a list of selectable values, a field in which a user may manually enter the threshold, or any other suitable interface feature or combination of features.

In various embodiments, the activities of blocks 504-510 may be performed for each surface that exists within the model, or only for a particular subset of the surfaces (e.g., those surfaces that have been identified by the user for selective display, or which satisfy some criterion such as geometry, position, texture, layer, etc.). Also, in various embodiments, the activities of blocks 504-510 may be initiated in response to various different conditions. For example, when the viewing direction changes (e.g., in response to a user selecting a different image to work with, or changing the viewing perspective of the model), or when the user changes the threshold value via the user interface, blocks 504-510 may be reevaluated with respect to some or all of the model surfaces. Correspondingly, some surfaces that were previously hidden may become visible, or vice versa.

It is contemplated that in some embodiments, a fixed number of different viewing positions may be defined (e.g., in an image-based model having a fixed number of source images). In some such embodiments, the angles between some or all of the normal vectors of the existing surfaces and the various viewing positions may be precomputed, such that when a user selects one of the source images to view, the angles may already be known, thereby improving performance.

Figure 7:
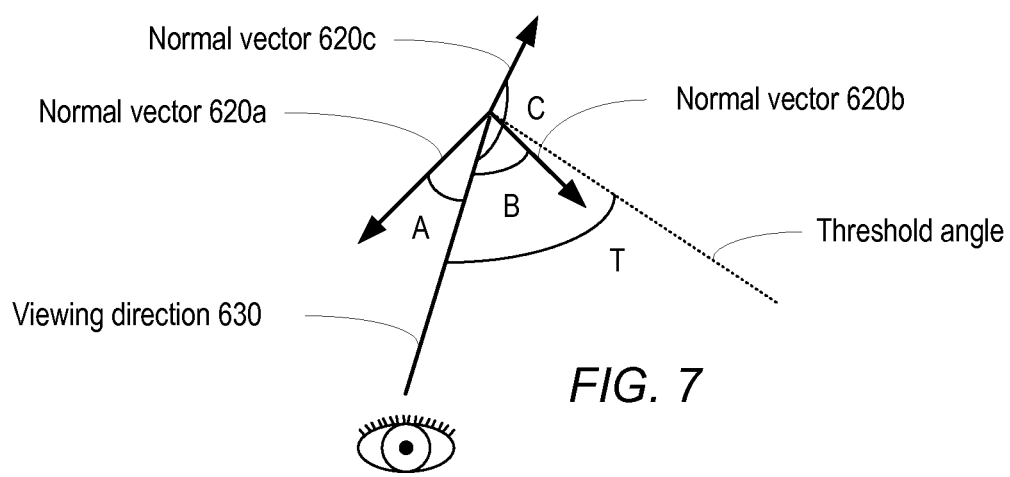
FIG. 7 illustrates one example of angular relationships that may exist between various surface normal vectors and a viewing direction.

FIG. 7 illustrates one example of the angular relationships between various normal vectors and a viewing direction. In the illustrated embodiment, normal vectors 620*a-b* and viewing direction 630 of FIG. 6 are shown extended to a common intersecting point. Normal vector 620*c*, which corresponds to a surface that is hidden from view in FIG. 6 and facing away from the current viewing direction, is also shown. The angles between each of normal vectors 620*a-c* and viewing direction 630 are represented as A, B, and C. Suppose these three angles have respective values of 25, 50, and 135 degrees. If the user specifies a threshold angle T of 60 degrees, then surfaces 610*a-b* may be displayed, since their respective angles are less than 60 degrees. The surface corresponding to normal vector 620*c* may be omitted from the display, since its respective angle is greater than 60 degrees. It is noted that in general, normal vectors that lie at angles greater than 90 degrees from the viewing direction may denote surfaces that face away from the viewing direction.

Conceptually, application of the threshold value to the various angular relationships between normal vectors and a viewing direction may be understood as determining whether a normal vector falls within a cone around the viewing direction that is specified by the threshold value. Those surfaces having normal vectors that fall within the cone (and in some cases, on the cone's surface) may be displayed, whereas those surfaces having normal vectors falling outside the cone may be omitted from a model display. In FIG. 7, such a hypothetical cone may be constructed by rotating the dashed line about viewing direction 630 at a constant angle of T. In some embodiments, rather than specifically determining the angles between normal vectors and a viewing direction, other techniques may be employed to determine whether a normal vector falls within or on the surface of such a cone.

Figure 8A:
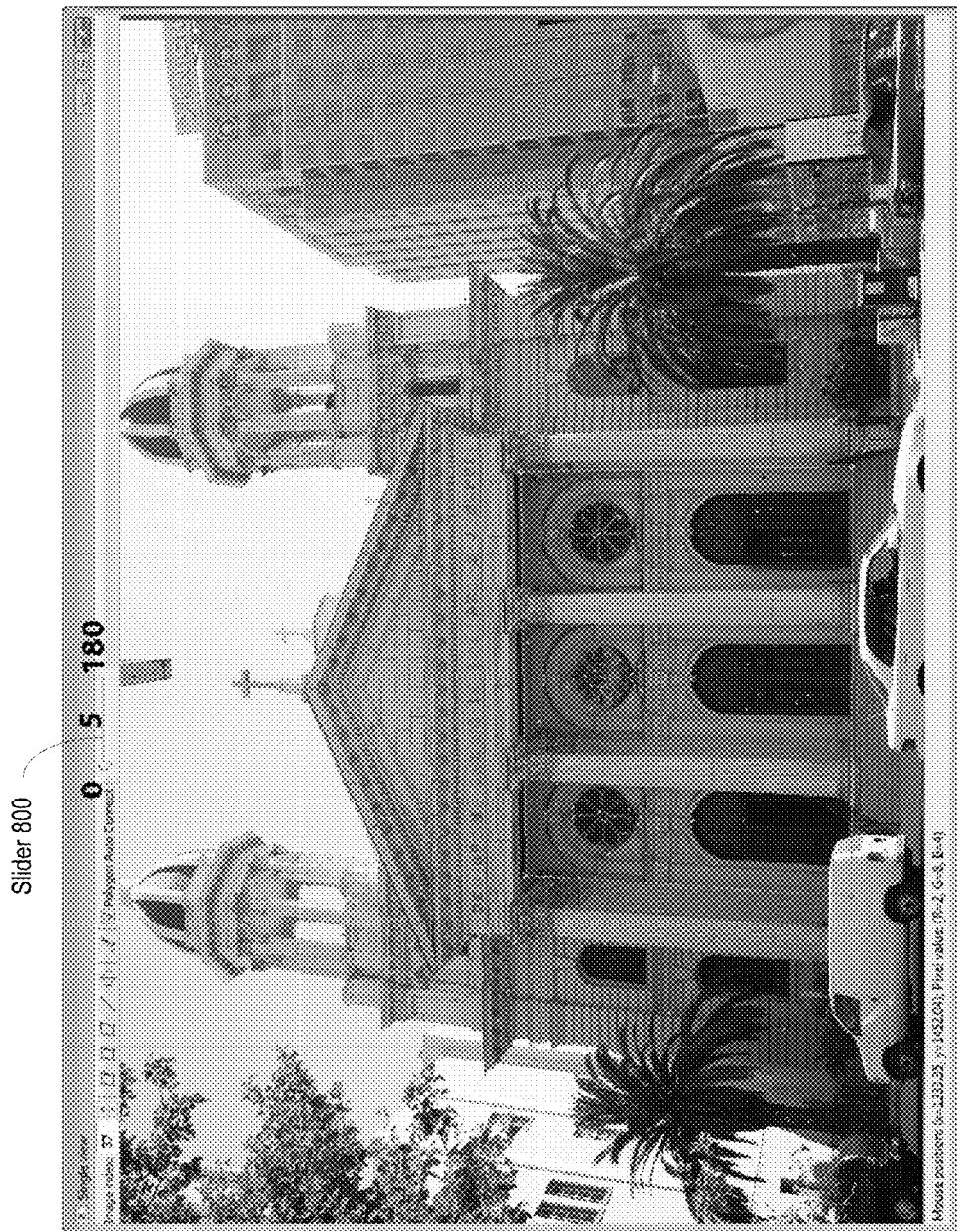
FIGS. 8A-B illustrate examples of selectively displaying surfaces of a model according to the angular relationships between the model surfaces and the viewing direction.
Figure 8B:
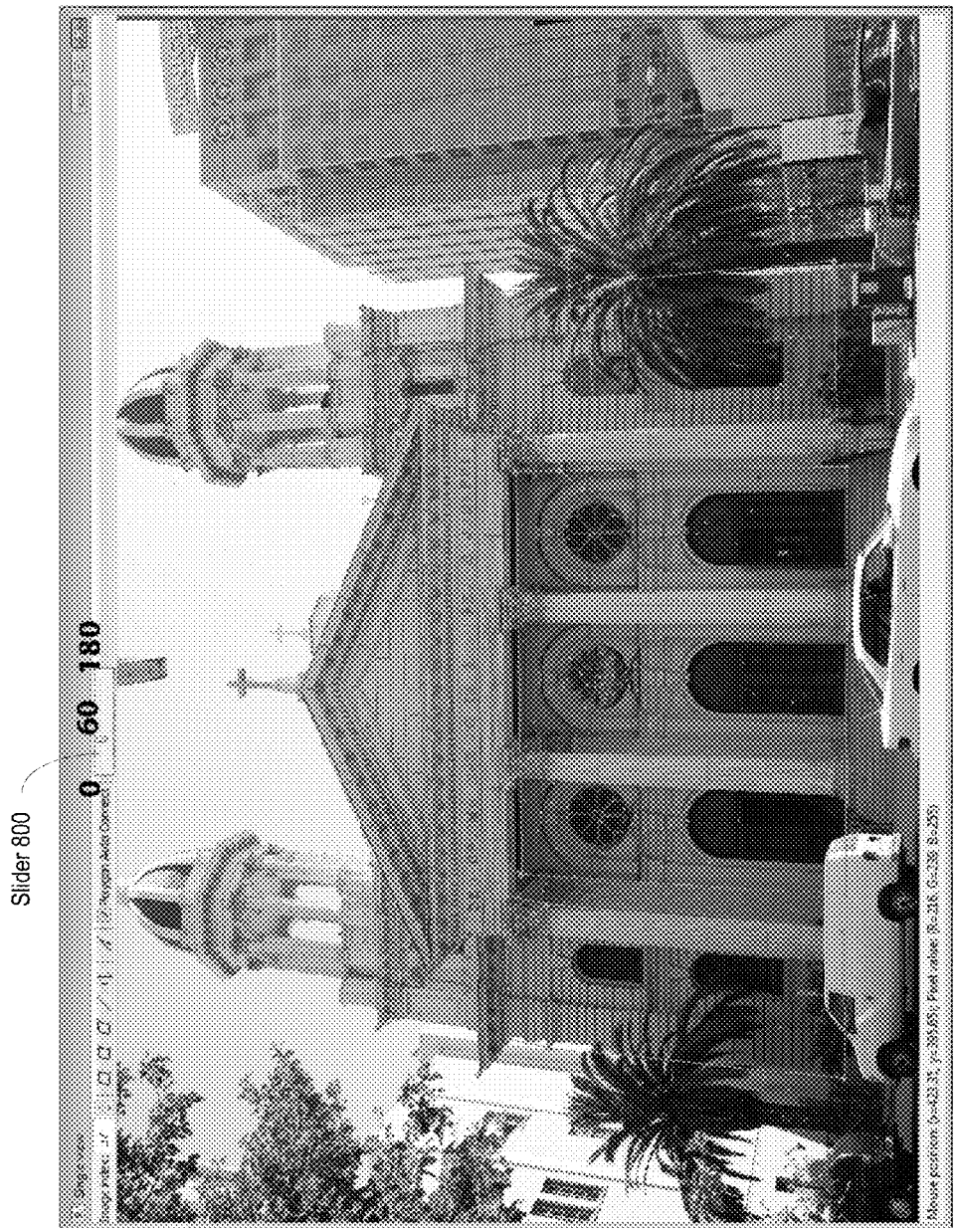

FIGS. 8A-B illustrate an application of the techniques described above to the cluttered model displayed in FIG. 4C. FIG. 8A displays a slider 800 that a user may use to select the threshold angle, and correspondingly control the display of model surfaces. In FIG. 8A, the slider is set to a threshold value of 5 degrees. The surfaces shown outlined in green in FIG. 8A are those few surfaces of FIG. 4C having normal vectors at an angle of 5 degrees or less from the viewing direction of FIG. 8A. The remaining surfaces of FIG. 4C are omitted from the display, resulting in a considerably less cluttered view than that of FIG. 4C. In FIG. 8B, slider 800 is set to a more liberal threshold value of 60 degrees. A correspondingly greater number of surfaces is shown in FIG. 8B, although many surfaces remain hidden. In FIG. 4C, the slider is set to a value of 180 degrees. Since the maximum angle between any two vectors in three dimensions is 180 degrees, this has the effect of displaying all of the surfaces within the model.

As noted above, in some embodiments, model surfaces may be non-planar. In such embodiments, the above techniques may be employed with non-planar surfaces according to various implementations. In an implementation where a given non-planar surface is represented by only a single normal vector, processing of the given non-planar surface may occur in substantially the same fashion as described above for planar surfaces. In some implementations where a given non-planar surface has more than one corresponding normal vector, the angles between each normal vector of the given non-planar surface and the viewing position may be determined. If a certain number of these angles satisfy the threshold value (e.g., are less than the threshold value), the given non-planar surface may be displayed; otherwise, it may be omitted. The number of angles required to satisfy the threshold value may itself be a user-adjustable parameter. For example, the number may range from a single angle to all angles, and may also be specified in qualitative terms (e.g., a plurality or majority of the available angles).

In the foregoing discussion, selective display of model surfaces has been described in the context of initially generating an object model through the use of an image-based modeling system. However, it is contemplated that in some embodiments, the technique of selectively displaying model surfaces described herein may be employed in conjunction with any use of an object model, regardless of the manner in which the model was created. For example, surfaces of an existing model that was created using techniques other than the techniques described above may also be selectively displayed according to the relationship of normal vectors of the surfaces to the viewing direction of the model.

In some embodiments, additional criteria may be used to determine whether or not a given surface of a model is visibly displayed. For example, when viewed from a particular viewing direction, one surface of a model may completely occlude another surface, such as in the case where a large-area surface completely overlaps a smaller-area surface that is more distant from the viewing position. (In some embodiments, occlusion may be determined strictly as a function of surface geometry without regard for whether the occluding surface is actually opaque, while in other embodiments, surface texture may also be taken into account when determining occlusion.) In one embodiment, the occluded surface may be omitted from the model display, even though the normal vector of the occluded surface may satisfy the threshold value specified by the user. That is, the occlusion of surfaces may be employed as a criterion for selective surface display in addition to the relationships of surface normal vectors to the viewing position.

Also, in some instances, one surface may be only partially occluded by another surface. In some embodiments, the degree of surface occlusion may be a user-specifiable parameter that may additionally control whether or not a surface is displayed within the model. For example, a user may specify that surfaces that are no more than 50% occluded from the current viewing position should be displayed, in which case a surface that is 75% occluded (i.e., only 25% of the surface is visible) may not be displayed at all.

Exemplary Computer System Embodiment

As noted above, in some embodiments, any of the methods or techniques described above may be implemented as program instructions and data capable of being stored on a computer-accessible storage medium and executed or manipulated by a processor. Such methods or techniques may include, for example and without limitation, the functions user interface module 210, image-based modeling module 220, and/or model data store 230, as well as the method illustrated in FIG. 5 and any suitable variations thereof. Such program instructions may be executed to perform a particular computational function, such as functions to manipulate or analyze vectors, polygons, or other geometric elements, general optimization or solution functions, database functions, operating system functionality, applications, and/or any other suitable functions.

Figure 9:
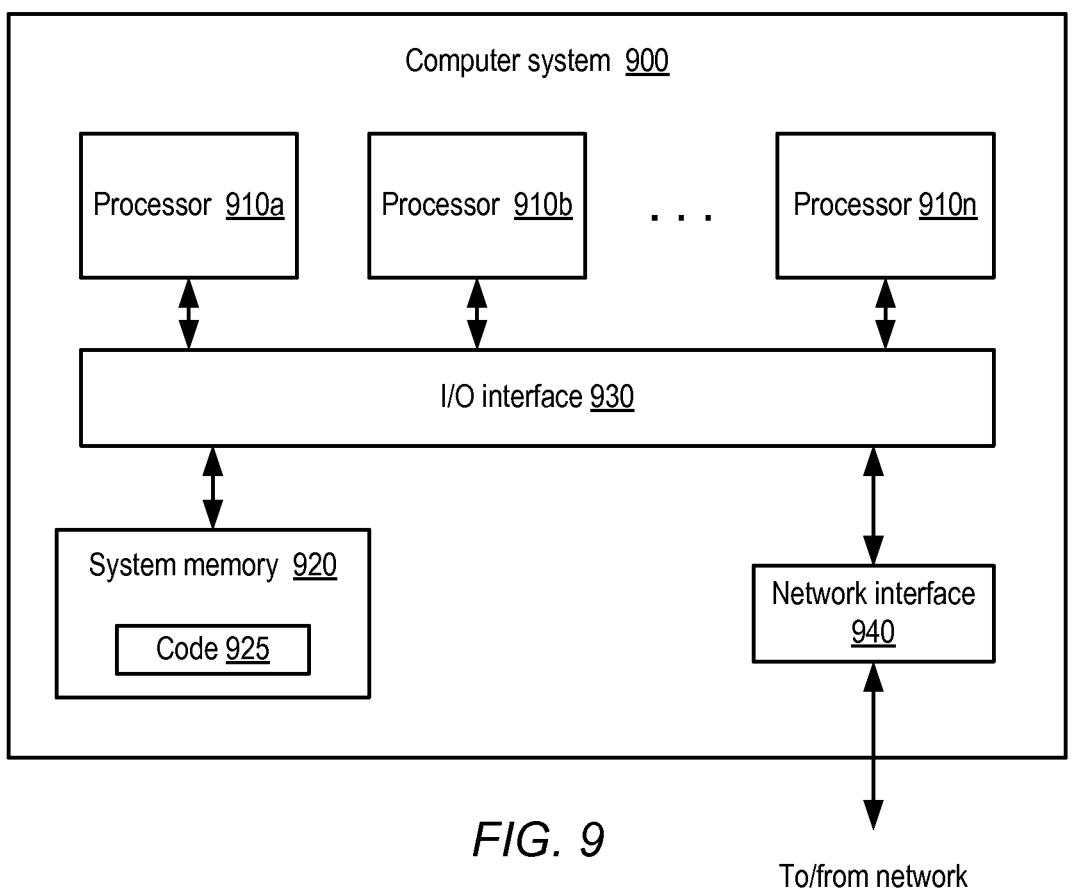
FIG. 9 illustrates one exemplary embodiment of a computer system.

One exemplary embodiment of a computer system including computer-accessible media is illustrated in FIG. 9. Computer system 900 may be an example of computer system 120 shown in FIGS. 1-2. In the illustrated embodiment, computer system 900 includes one or more processors 910 coupled to a system memory 920 via an input/output (I/O) interface 930. Computer system 900 further includes a network interface 940 coupled to I/O interface 930. In other embodiments, computer system 900 may include more, fewer, or different components than those shown in FIG. 9.

In various embodiments computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by process 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 920 may be one embodiment of a computer-accessible storage medium configured to store program instructions and data as described above. However, in other embodiments, program instructions and/or data may be stored upon different types of computer-accessible media. Generally speaking, a computer-accessible storage medium may include media such as magnetic or optical media, e.g., disk or CD/DVD-ROM coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Program instructions and data stored via a computer-accessible storage medium may be transmitted by transmission media or signals such as electrical, electromagnetic, or digital signals, which may be conveyed via a communication medium such as a network and/or a wireless link, such as may be implemented via network interface 940. However, it is noted that storage media and transmission media are distinct and nonoverlapping categories of media.

It is noted that the order of operation described above with respect to various methods and techniques discussed above has been chosen to facilitate exposition, but does not necessarily represent the only order of operation that is possible. In cases where the elements of a method are independent of one another, it is contemplated that such elements may be performed in any suitable order, and the foregoing discussion should be regarded as merely exemplary and not restrictive.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
receiving input identifying features in one or more images of a three-dimensional (3D) physical object, the identified features effective to define one or more surfaces for the 3D physical object, and said surfaces that are defined forming an existing object model;
selectively displaying said surfaces of the existing object model of the 3D physical object at a current viewing direction to reduce a number of surfaces displayed at the current viewing direction, said selectively displaying comprising:
determining a normal vector for a given surface included in the existing object model;
determining an angle between the normal vector of the given surface and the current viewing direction of the existing object model; and
determining whether the angle between the normal vector and the current viewing direction is greater than a threshold value, and:
displaying the existing object model without the given surface if the angle is greater than the threshold value; or
displaying the existing object model with the given surface if the angle between the normal vector and the current viewing direction is less than the threshold value.

2. The computer-implemented method as recited in claim 1, wherein the threshold value is selectable.

3. The computer-implemented method as recited in claim 1, wherein the one or more images from which the features are identified capture different perspectives of the 3D physical object.

4. The computer-implemented method as recited in claim 3, wherein the given surface corresponds to a user-identified feature of one said image of the 3D physical object.

5. The computer-implemented method as recited in claim 3, further comprising determining the current viewing direction at which the existing object model is viewed based upon camera motion data recovered from at least some of the one or more images of the 3D physical object.

6. The computer-implemented method as recited in claim 1, wherein at least one said surface corresponds to a respective two-dimensional planar surface.

7. The computer-implemented method as recited in claim 1, wherein the given surface is a non-planar surface.

8. The computer-implemented method as recited in claim 1, further comprising:
determining that the current viewing direction of the model has changed to a new viewing direction of the model;
in response to determining that the current viewing direction of the model has changed, determining an angle between the normal vector to the given surface and the new viewing direction of the model; and
selectively displaying the given surface based upon the angle between the normal vector and the new viewing direction.

9. The computer-implemented method as recited in claim 1, further comprising:
determining that the threshold value has changed to a new threshold value; and
in response to determining that the threshold value has changed, selectively displaying the given surface based upon whether the angle between the normal vector and the current viewing direction is greater than the new threshold value.

10. A computer-accessible storage medium storing program instructions that are executable on a computer to perform operations comprising:
receiving input identifying features in one or more images of a three-dimensional (3D) physical object, the identified features effective to define one or more surfaces for the 3D physical object, and said surfaces that are defined forming an existing object model;
selectively displaying said surfaces of the existing object model of the 3D physical object at a current viewing direction to reduce a number of surfaces displayed at the current viewing direction, to selectively displaying said surfaces comprising:
determining a normal vector for a given surface included in the existing object model;
determining an angle between the normal vector of the given surface and the current viewing direction of the existing object model; and
determining whether the angle between the normal vector and the current viewing direction is greater than a threshold value, and:
displaying the existing object model without displaying the given surface if the angle is greater than the threshold value; or
displaying the existing object model with the given surface if the angle between the normal vector and the current viewing direction is less than the threshold value.

11. The computer-accessible storage medium as recited in claim 10, wherein the threshold value is selectable.

12. The computer-accessible storage medium as recited in claim 10, wherein the one or more images from which the features are identified capture different perspectives of the 3D physical object.

13. The computer-accessible storage medium as recited in claim 12, wherein the given surface corresponds to a user-identified feature of one said image of the 3D physical object.

14. The computer-accessible storage medium as recited in claim 12, wherein the operations further comprise determining the current viewing direction at which the existing object model is viewed based upon camera motion data recovered from at least some of the one or more images of the 3D physical object.

15. The computer-accessible storage medium as recited in claim 10, wherein at least one said surface corresponds to a respective two-dimensional planar surface.

16. The computer-accessible storage medium as recited in claim 10, wherein the given surface is a non-planar surface.

17. The computer-accessible storage medium as recited in claim 10, wherein the operations further comprise:
determining that the current viewing direction of the model has changed to a new viewing direction of the model;
in response to determining that the current viewing direction of the model has changed, determining an angle between the normal vector to the given surface and the new viewing direction of the model; and
selectively displaying the given surface based upon the angle between the normal vector and the new viewing direction.

18. The computer-accessible storage medium as recited in claim 10, wherein the operations further comprise:
determining that the threshold value has changed to a new threshold value; and in response to determining that the threshold value has changed, selectively displaying the given surface based upon whether the angle between the normal vector and the current viewing direction is greater than the new threshold value.

19. A system, comprising:
a display device;
a system memory; and
a processor coupled to the system memory and configured to execute instructions, wherein the instructions are executable by the processor to perform operations comprising:
receiving input identifying features in one or more images of a three-dimensional (3D) physical object, the identified features effective to define one or more surfaces for the 3D physical object, and said surfaces that are defined forming an existing object model;
selectively displaying said surfaces of the existing object model of the 3D physical object at a current viewing direction to reduce a number of surfaces displayed at the current viewing direction, selectively displaying surfaces of the existing object model being performed while the input identifying the features in the one or more images is received and comprising:
determining a normal vector for a given surface included in the existing object model;
determining an angle between the normal vector of the given surface and the current viewing direction of the existing object model; and
determining whether the angle between the normal vector and the current viewing direction is greater than a threshold value, and:
displaying the existing object model on the display device without the given surface if the angle is greater than the threshold value; or
displaying the existing object model on the display device with the given surface if the angle between the normal vector and the current viewing direction is less than the threshold value.

20. The system as recited in claim 19, wherein the threshold value is selectable.

21. The system as recited in claim 19, wherein the one or more images from which the features are identified capture different perspectives of the 3D physical object.

22. The system as recited in claim 21, wherein the given surface corresponds to a user-identified feature of one said image of the 3D physical object.

23. The system as recited in claim 21, wherein the operations further comprise determining the current viewing direction at which the existing object model is viewed based upon camera motion data recovered from at least some of the one or more images of the 3D physical object.

24. The system as recited in claim 19, wherein at least one said surface corresponds to a respective two-dimensional planar surface.

25. The system as recited in claim 19, wherein the given surface is a non-planar surface.

26. The system as recited in claim 19, wherein the operations further comprise:
determining that the current viewing direction of the model has changed to a new viewing direction of the model;
in response to determining that the current viewing direction of the model has changed, determining an angle between the normal vector to the given surface and the new viewing direction of the model; and
selectively displaying the given surface based upon the angle between the normal vector and the new viewing direction.

27. The system as recited in claim 19, wherein the operations further comprise:
determining that the threshold value has changed to a new threshold value;
in response to determining that the threshold value has changed, selectively displaying the given surface based upon whether the angle between the normal vector and the current viewing direction is greater than the new threshold value.

28. A computer-implemented method, comprising:
executing instructions on a specific apparatus so that binary digital electronic signals, representing features identified by input relative to one or more images of a three-dimensional (3D) physical object, are transformed to define one or more surfaces for the 3D physical object, said surfaces that are defined forming an existing object model;
executing instructions on said specific apparatus so that binary digital signals, representing said surfaces of the existing object model of the 3D physical object, are transformed to selectively display said surfaces of the existing object model at a current viewing direction to reduce a number of surfaces displayed at the current viewing direction, selectively displaying said surfaces of the existing object model comprising:
executing instructions on said specific apparatus so that binary digital electronic signals, representing a given surface included in the existing object model, are transformed to determine a normal vector for the given surface;
executing instructions on said specific apparatus so that binary digital electronic signals representing the normal vector are analyzed to determine an angle between the normal vector of the given surface and the current viewing direction of the existing object model; and
executing instructions on said specific apparatus so that binary digital electronic signals representing the angle are analyzed to determine whether the angle between the normal vector and the current viewing direction is greater than a threshold value, and:
executing instructions on said specific apparatus so that binary digital electronic signals, representing the existing object model, are transformed to display the existing object model without the given surface if the angle is greater than the threshold value; or
executing instructions on said specific apparatus so that binary digital electronic signals, representing the existing object model, are transformed to display the existing object model with the given surface if the angle between the normal vector and the current viewing direction is less than the threshold value.

* * * * *

UNITED STATES PATENT AND TRADEMARK OFFICE
CERTIFICATE OF CORRECTION

| | | |
|---|---|---|
| PATENT NO. | : 8,638,334 B2 | Page 1 of 1 |
| APPLICATION NO. | : 12/323242 | |
| DATED | : January 28, 2014 | |
| INVENTOR(S) | : Hailin Jin et al. | |

It is certified that error appears in the above-identified patent and that said Letters Patent is hereby corrected as shown below:

In the Claims

Column 16, Line 26, after "...object model without", delete "displaying", therefor.

Signed and Sealed this
Fifteenth Day of April, 2014

Michelle K. Lee
*Deputy Director of the United States Patent and Trademark Office*